(12) United States Patent
Fritzer et al.

(10) Patent No.: US 7,878,708 B2
(45) Date of Patent: Feb. 1, 2011

(54) TEMPERATURE SENSOR ARRANGEMENT IN AN AUTOMATIC GEARBOX

(75) Inventors: Anton Fritzer, Markdorf (DE); Tobias Pfleger, Friedrichshafen (DE); Georg Ege, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 430 days.

(21) Appl. No.: 11/908,615

(22) PCT Filed: Mar. 15, 2006

(86) PCT No.: PCT/EP2006/002385

§ 371 (c)(1),
(2), (4) Date: Feb. 11, 2008

(87) PCT Pub. No.: WO2006/097295

PCT Pub. Date: Sep. 21, 2006

(65) Prior Publication Data

US 2008/0267255 A1      Oct. 30, 2008

(30) Foreign Application Priority Data

Mar. 17, 2005    (DE) ...................... 10 2005 012 257

(51) Int. Cl.
*G01K 1/00* (2006.01)

(52) U.S. Cl. ................. 374/148; 374/141; 374/144
(58) Field of Classification Search ................. 374/141, 374/144, 148
See application file for complete search history.

(56) References Cited

U.S. PATENT DOCUMENTS

| 5,749,060 | A | 5/1998 | Graf et al. |
| 6,393,943 | B1 | 5/2002 | Sommer et al. |
| 6,530,856 | B1 | 3/2003 | Kakiage |
| 6,663,279 | B1 * | 12/2003 | Heinzelmann et al. ...... 374/144 |
| 6,688,383 | B1 | 2/2004 | Sommer et al. |
| 7,289,892 | B2 * | 10/2007 | Isogai et al. .................. 701/29 |
| 2009/0088281 | A1 * | 4/2009 | Mizobe et al. ............... 475/123 |

FOREIGN PATENT DOCUMENTS

| DE | 4334595 | 4/1995 |
| DE | 29513950 U1 | 2/1997 |
| DE | 19943069 | 3/2001 |
| DE | 10130833 | 1/2002 |
| DE | 10329907 | 1/2005 |

* cited by examiner

*Primary Examiner*—Lisa M Caputo
*Assistant Examiner*—Mirellys Jagan
(74) *Attorney, Agent, or Firm*—Davis & Bujold, P.L.L.C.

(57) ABSTRACT

A temperature sensor arrangement in an automatic transmission in which the temperature sensor (1) is arranged such that oil leaked from the hydraulic system permanently flows around it.

12 Claims, 2 Drawing Sheets

TEMPERATURE SENSOR ARRANGEMENT IN AN AUTOMATIC GEARBOX

This is a national stage completion of PCT/EP2006/002385 filed Mar. 15, 2006 which claims priority from German Application Serial No. 10 2005 012 257.4 filed Mar. 17, 2005.

FIELD OF THE INVENTION

The present invention concerns the temperature sensor arrangement in an automatic transmission.

BACKGROUND OF THE INVENTION

In the pressure regulators used in such transmissions there occurs a temperature-dependent shift of the performance characteristic curve which, unless compensated for, has an adverse effect on gear engagement. To compensate for this characteristic curve shift in the control system, according to the prior art the temperature is measured. To do this the temperature sensors present in the electronic modules of the transmission can be used, for example the temperature sensors of the pressure sensors or the LTCC (Low Temperature Cofired Ceramic) elements. The temperature measured by these sensors is disadvantageously affected by a district time lag relative to the actual transmission oil temperature, so it is necessary to have a separate temperature sensor at a suitable point.

For that reason it has been proposed to collect return oil from the transmission in a sump and pass it through an opening around a temperature sensor. This design has the disadvantage that at low temperatures it is not certain that enough oil will collect in the sump.

SUMMARY OF THE INVENTION

The purpose of the present invention is to provide a temperature sensor arrangement in automatic transmissions which can determine the actual temperature determined even at low temperatures without having to provide any additional on going leakage.

Accordingly, a temperature sensor arrangement in an automatic transmission is proposed, in which the temperature sensor is arranged in such manner that leakage oil from the hydraulic system continually flows around it. In this way the oil temperature can be measured directly.

The temperature sensor is preferably positioned at a point where the oil has not yet flowed through the torque converter, as this would result in heating of the oil. Moreover, the point chosen for positioning the temperature sensor is one at which leakage oil is already continually flowing. This has the advantage that no additional screen for producing a continual flow need be provided.

According to a first embodiment of the invention it is proposed to arrange the temperature sensor such that oil leaked from a pressure regulator of the transmission, which continually regulates oil in the control output range within the temperature range that is relevant for a cold start, flows around it.

In a preferred embodiment of the invention the leakage oil from the pressure regulator enters a duct of the hydraulic system and passes under the baseplate of the electronic module, where it emerges through a hole and flows through an opening in the baseplate of the electronic module. According to the invention the temperature sensor is arranged in the opening so that the leakage oil flows around it. So that the leakage oil flows to the sensor, it is provided that the baseplate of the electronic module contacts the hydraulic system in an area around the temperature sensor.

An advantageous further development provides that the tank edges of several pressure regulators are combined for temperature measurement, one of which is always working in the control range. This ensures a temperature measurement even when the Closed End (CE) function cuts a tank off completely or when, at maximum pressure, no oil is flowing to a tank.

For example, in a belt-type transmission the tank edges of the pressure regulator can be combined by disk 1 and disk 2.

In an automatic transmission the leakage oil of the pre-filling valve of the transmission's shift elements can also be used for temperature measurement. The pre-filling duct is throttled from the reducing pressure by two screens and the pre-filling pressure is usually adjusted by means of a plate valve, this pre-filling pressure ensuring that the vented shift elements do not operate while empty. At low temperatures the leakage into the vented shift elements is small, so oil flows to the tank via the pre-filling plate valve.

BRIEF DESCRIPTION OF THE DRAWINGS

Below, an example of the invention is explained in more detail with reference to the attached drawings in which.

DETAILED DESCRIPTION OF THE INVENTION

Figure 1:
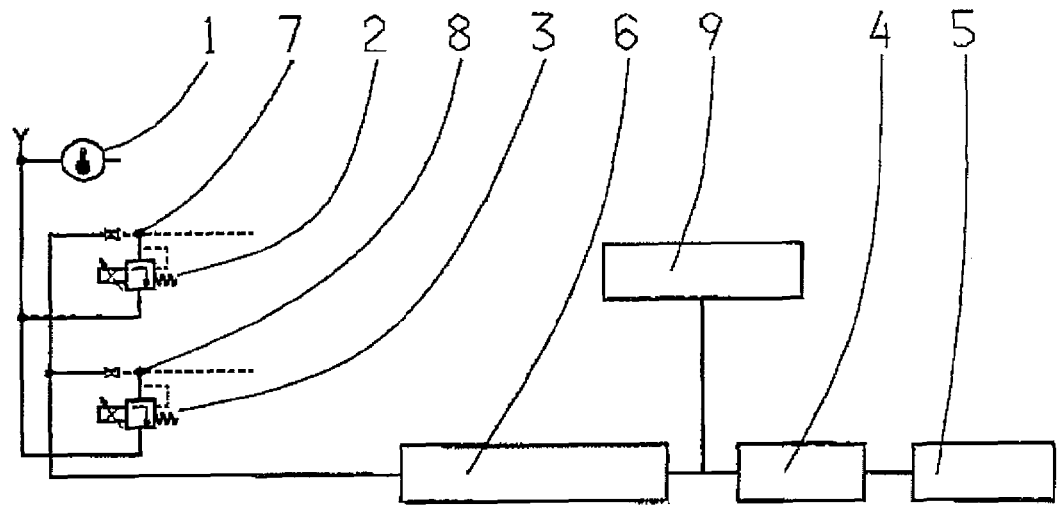
FIG. 1 is a Circuit diagram illustrating a possible arrangement of the temperature sensor in a continuously variable transmission according to the invention.

According to the invention and with reference to FIG. 1, which shows an example flow scheme, the temperature sensor 1 is arranged so that leakage oil from at least one pressure regulator 2, 3 of the transmission, which continually regulates in the control range within a temperature range relevant for a cold start, flows around it. In the example embodiment according to FIG. 1 the temperature sensor 1 is arranged in such a manner that the tank edges of the disk 1—and disk 2—pressure regulator 2, 3 of a belt-type transmission are combined for temperature measurement. This advantageously ensures that at any operating point oil is available for temperature measurement. The oil is supplied by the pump 4 from the oil sump 5 via a pressure reducing valve 6, via the disk 1—and the disk 2—valve 7, 8 to the pressure regulators of disk 1 and disk 2. The index 9 indicates further consumers, such as a converter of the transmission.

Figure 2:
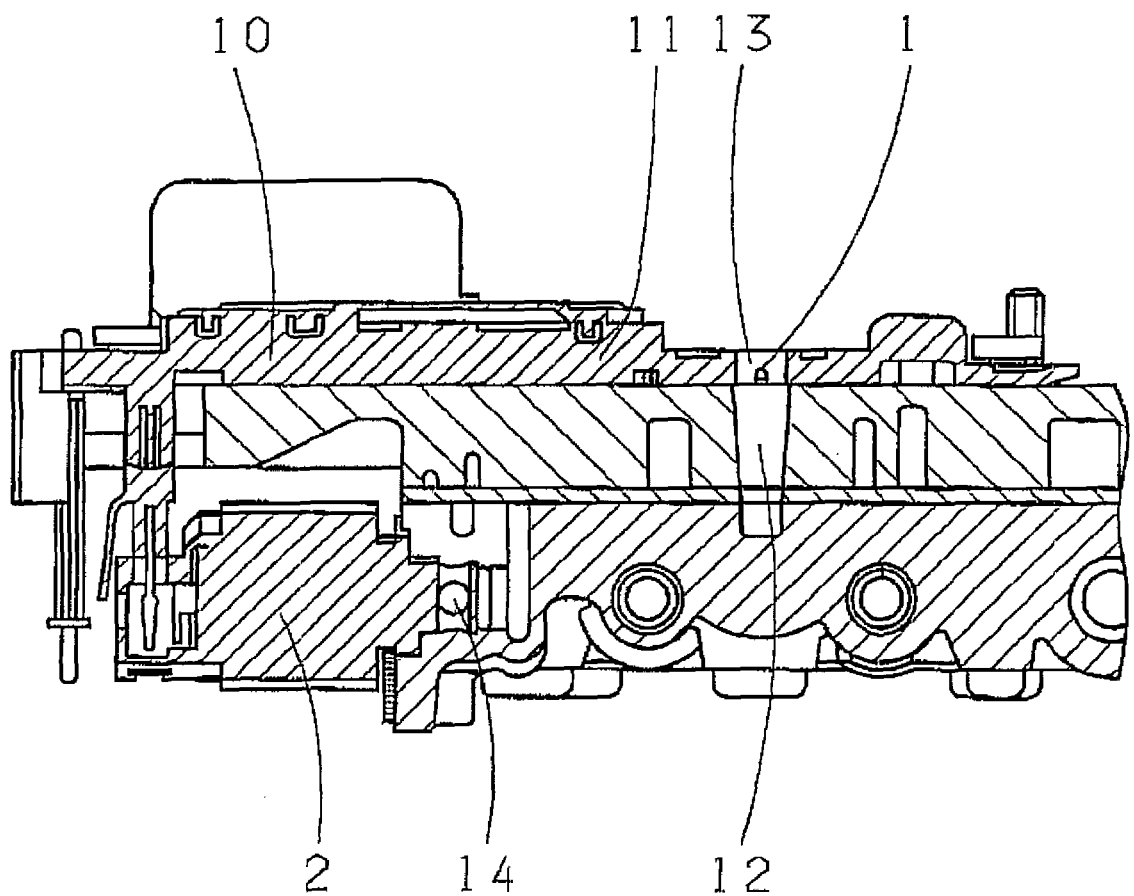
FIG. 2 is a Schematic sectioned view of the electronic module and the pressure regulator of an automatic transmission, which makes clear the arrangement of the temperature sensor.

In the arrangement shown in FIG. 1, according to FIG. 2 the leakage oil of the at least one pressure regulator 2 passes from the tank side 14 into a duct of the hydraulic system and is led under the baseplate 11 of the electronic module 10, where it emerges through a hole 12 and flows through an opening 13 in the baseplate 11 of the electronic module 10. As can be seen in FIG. 2, the temperature sensor 1 is arranged in this opening 13 in such a position that the leakage oil flows around it.

Figure 3:
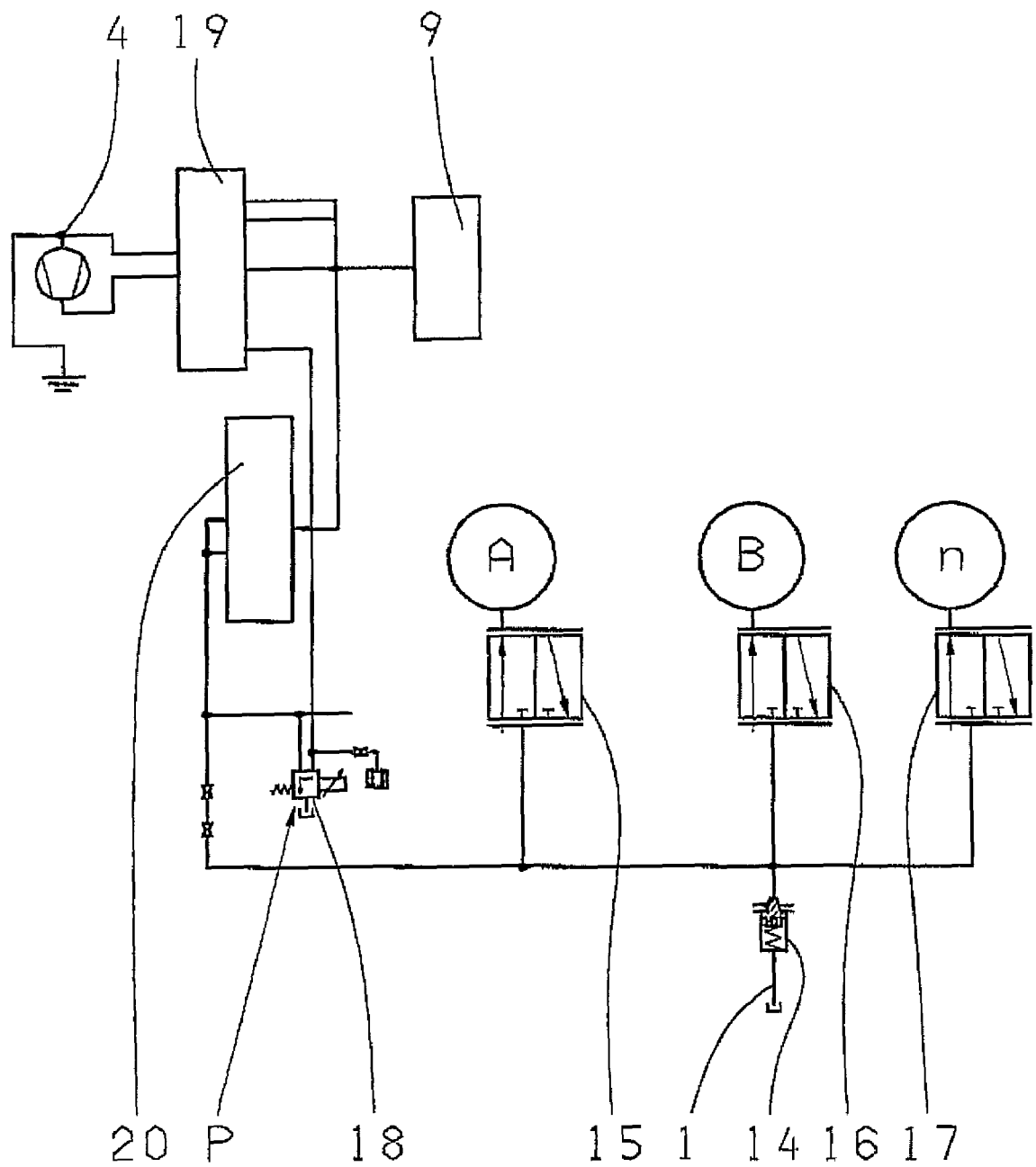
FIG. 3 is a Circuit diagram illustrating a possible arrangement of the temperature sensor in an automatic transmission according to the invention.

FIG. 3 illustrates a possible arrangement according to the invention of the temperature sensor 1 in an automatic transmission, referring to the circuit diagram shown. The temperature sensor 1 is arranged on the pre-filling valve 14 of the shift elements A, B, n of the transmission and the leakage oil of the pre-filling valve 14 flows around it. At low temperatures the leakage into the vented shift elements is small, so oil flows via the pre-filling valve to the tank and thus flows around the temperature sensor 1. In FIG. 3 the coupling valves of the shift elements A, B, n are indexed 15, 16 and 17 respectively; the pressure reducing valve is indexed 20. Further, the arrow P indicates the already described alternative position of the temperature sensor on the tank trap of the pressure regulator 18 of the system pressure valve 19.

Of course, any structural design, in particular any spatial arrangement of the temperature sensor, provided that it is technically appropriate, falls within the protective scope of the claims below, even if the structures are not explicitly shown in the figures or in the description.

INDEXES

1 Temperature sensor
2 Pressure regulator
3 Pressure regulator
4 Pump
5 Oil sump
6 Pressure reducing valve
7 Disk 1—valve
8 Disk 2—valve
9 Consumer
10 Electronic module
11 Baseplate of the electronic module
12 Hole
13 Opening
14 Pre-filling valve
15 Coupling valve
16 Coupling valve
17 Coupling valve
18 Pressure regulator
19 System pressure valve
20 Pressure reducing valve
A Shift element
B Shift element
n Shift element(s)

The invention claimed is:

1. A temperature sensor arrangement in an automatic transmission comprising:
   a hydraulic system for providing a flow of oil to both a consumer (9) and an electronic module (10);
   a primary oil flow extending from a pump (4) to the consumer (9) for supplying oil thereto; and
   a secondary oil flow extending from the pump (4) to at least one pressure regulator (2, 3) and being arranged parallel to the primary oil flow;
   wherein the secondary flow path includes a leakage flow path which continuously flows from the secondary path to the sump; and
   a temperature sensor is located within the leakage flow path such that the temperature sensor (1) continuously senses a temperature of the oil flowing along the leakage oil path.

2. The temperature sensor arrangement in the automatic transmission according to claim 1, wherein the temperature sensor (1) is arranged adjacent a pre-filling valve (14) of shift elements (A, B, n) of the transmission, so that the leakage oil of the pre-filling valve (14) flows around temperature sensor (1).

3. The temperature sensor arrangement in the automatic transmission according to claim 1, wherein the temperature sensor (1) only senses a temperature of the leakage oil flow.

4. The temperature sensor arrangement in the automatic transmission according to claim 1, wherein the temperature sensor (1) is arranged so that leakage oil from the at least one pressure regulator (2, 3) of the transmission, which regulates continually in a control range within a temperature range that is relevant for a cold start, flows around the temperature sensor (1).

5. The temperature sensor arrangement in the automatic transmission according to claim 4, wherein the temperature sensor (1) is arranged in an opening (13) formed in a baseplate (11) of an electronic module (10), and the leakage oil from the at least one pressure regulator (2) passes into a duct of a hydraulic system and is led under the baseplate (11) of the electronic module (10), where the leakage oil then emerges and flows through the opening (13) in the baseplate (11).

6. An arrangement of a temperature sensor in the automatic transmission having a torque converter (9) and an electronic module (10), the arrangement comprising:
   a hydraulic system conducting a flow of oil to both the torque converter (9) and the electronic module (10);
   a primary oil flow path extending from a pump (4) to the torque converter (9);
   a secondary oil flow path extending from the pump (4) to at least one pressure regulator (2, 3) which flows parallel to the primary oil flow path,
   a leakage oil flow branching off from the secondary oil flow path from the at least one pressure regulator (2, 3), and flowing through a duct of the hydraulic system, located under a baseplate (11) of the electronic module (10), and through an opening (13) in the baseplate (11); and
   the temperature sensor (1) being located in the opening (13) in the baseplate (11) for sensing a temperature of the leakage oil.

7. An arrangement of a temperature sensor in an automatic transmission comprising:
   a hydraulic system including a pump and having primary and secondary flow paths flowing from the pump parallel to one another,
   a consumer being coupled to the oil pump via the primary oil flow path,
   at least one pressure regulator valve being coupled to the oil pump via the secondary flow path,
   a leakage flow path branching off from the secondary flow path and leakage oil constantly flowing along the leakage flow path to the sump during operation of the pump;
   a temperature sensor being located along the leakage flow path such that the temperature sensor constantly senses a temperature of the oil flowing within the leakage oil path.

8. The arrangement of the temperature sensor in the automatic transmission according to claim 7, wherein the leakage flow path constantly flows from the at least one pressure regulator valve to the sump during operation of the pump, and the temperature sensor is located within the leakage oil flowing from the at least one pressure regulator valve.

9. The arrangement of the temperature sensor in the automatic transmission according to claim 7, wherein a pressure reducing valve is arranged along the secondary flow path between the at least one pressure regulator valve and the oil pump.

10. The arrangement of the temperature sensor in the automatic transmission according to claim 7, wherein a system pressure valve is arranged along the secondary flow path between both the at least one pressure regulator valve and the oil pump;

a pressure reducing valve is coupled to the system pressure valve via the secondary oil flow path;

at least one shift element valve is coupled to both the at least one pressure regulator valve and the pressure reducing valve via the secondary oil flow path; and at least one pre-filling valve is coupled to the pressure reducing valve, the at least one shift element valve, and the at least one pressure regulator valve via the secondary oil flow path.

11. The arrangement of the temperature sensor in the automatic transmission according to claim 7, wherein the hydraulic system includes a system pressure valve;

a plurality of coupling valves are connected to the secondary flow path and a pressure reducing valve is located between the system pressure valve and the plurality of coupling valves; and at least one pre-filling valve is connected with the pressure reducing valve.

12. The arrangement of the temperature sensor in the automatic transmission according to claim 11, wherein the leakage flow path constantly flows from the at least one pre-filling valve to the sump during operation of the pump, and the temperature sensor is located within the leakage oil flowing from the at least one pre-filling valve.

\* \* \* \* \*